US008774263B2

(12) United States Patent
Forsyth et al.

(10) Patent No.: US 8,774,263 B2
(45) Date of Patent: Jul. 8, 2014

(54) TRANSMITTER AND RECEIVER FOR PULSE DENSITY MODULATED SIGNALS AND SIGNAL PROCESSING METHOD

(71) Applicant: ams AG, Unterpremstatten (AT)

(72) Inventors: Richard Forsyth, Graz (AT); Thomas Fröhlich, Ottikon (CH); Matthias Steiner, Seiersberg (AT)

(73) Assignee: ams AGe, Unterpremstätten (AT)

( * ) Notice: Subject to any disclaimer, the term of this patent is extended or adjusted under 35 U.S.C. 154(b) by 0 days.

(21) Appl. No.: 13/766,732

(22) Filed: Feb. 13, 2013

(65) Prior Publication Data

US 2013/0208783 A1    Aug. 15, 2013

(30) Foreign Application Priority Data

Feb. 15, 2012  (EP) .................................. 12155610

(51) Int. Cl.
*H04L 7/04*  (2006.01)
(52) U.S. Cl.
USPC ........... 375/239; 375/237; 375/238; 375/242; 332/112; 341/53; 341/55
(58) Field of Classification Search
CPC ..................... H04N 19/00006; H04L 25/4902; H04L 1/0041; H04L 25/03343; H04L 1/0068; H04L 1/0069; H03K 7/08; H03K 7/04; H03K 3/017; H03K 9/08; H03K 5/1252; H03K 9/04; H03K 5/19; H03M 7/30; H03M 5/08; H03M 1/822; H03M 3/3761; H03M 1/504

USPC .......... 375/237–240, 242; 341/52, 53, 55, 74; 332/109, 112
See application file for complete search history.

(56) References Cited

U.S. PATENT DOCUMENTS

| 6,563,393 | B2 * | 5/2003 | Zhang et al. | 332/106 |
| 8,564,365 | B2 * | 10/2013 | Dang et al. | 329/312 |
| 2001/0055353 | A1 * | 12/2001 | Rybicki et al. | 375/353 |

FOREIGN PATENT DOCUMENTS

| GB | 2281681 A | 3/1995 |
| WO | 98/48541 A2 | 10/1998 |

OTHER PUBLICATIONS

Magrath, A.J., et al., "Encoding Hidden Data Channels in Sigma Delta Bitstreams", IEEE, 1998, pp. 385-388; Department of Electronic Engineering King's College London.

* cited by examiner

*Primary Examiner* — Dac Ha
(74) *Attorney, Agent, or Firm* — McDermott Will & Emery LLP

(57) ABSTRACT

A transmitter (TX) for transmitting a pulse density modulated signal comprises means (SDM) for generating a pulse density modulated input signal (SI) and an encoder (ENC). The encoder (ENC) comprises a first input for receiving the pulse density modulated input signal (SI) and a second input for receiving additional information (AI) comprising at least one data bit. The encoder (ENC) is configured to generate a multi-bit telegram (TG) on the basis of the additional information (AI), the telegram (TG) comprising a predefined bit-sequence, and to replace an appropriate number of consecutive bits of the input signal (SI) with the telegram (TG) in order to generate an output signal (SO).

15 Claims, 3 Drawing Sheets

Figure 1:
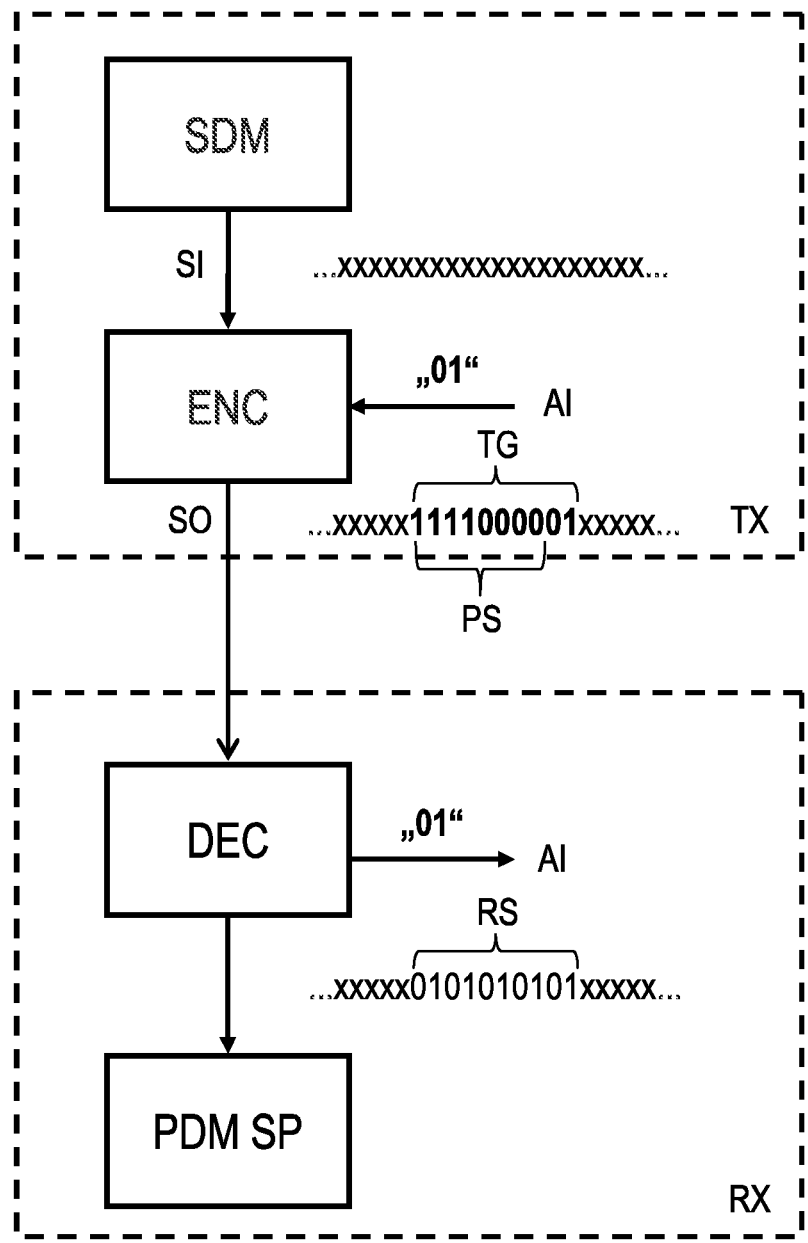

TRANSMITTER AND RECEIVER FOR PULSE DENSITY MODULATED SIGNALS AND SIGNAL PROCESSING METHOD

The invention relates to a transmitter for transmitting a pulse density modulated signal, a receiver for receiving a pulse density modulated signal, and to a signal processing method for processing pulse density modulated signals.

In various applications, data are transmitted using a pulse density modulated, PDM, signal, which is a bitstream corresponding to the data to be transmitted. Usage of PDM signals has the advantage that only a single serial line is needed for transmission. If the PDM signal corresponds to a continuous data signal, additional transmission lines are necessary, if additional information like control information or status information is to be transmitted.

It has been proposed to provide periodic time slots in the PDM bitstream, during which the additional information can be transmitted within the bitstream by replacing the original data in the PDM bitstream by the additional data. However, the periodic replacement of data, regardless of whether additional information is to be transmitted or not, results in a periodic impact on the data to be transmitted, in particular at the receiver side.

An object to be achieved consists in the provision of an improved concept for transmitting additional information within a pulse density modulated data stream.

This object is achieved with the subject-matter of the independent claims. Developments and further embodiments are the subject-matter of the dependent claims.

The improved concept is based on the idea that certain bit sequences never or almost never occur in a real pulse density modulated, PDM, signal. Hence, one or more of such bit sequences can be included into a PDM signal in order to indicate that additional information is transmitted within the PDM signal. As a consequence, the additional information can be transmitted whenever necessary and the PDM signal is unchanged, if no additional information is to be transmitted. Hence, the impact on the data to be transmitted with the PDM signal is kept low and is reduced compared to conventional approaches.

According to an embodiment of a transmitter for transmitting a PDM signal, the transmitter comprises means for generating a PDM input signal and an encoder. The means for generating the PDM input signal may be realized by a sigma-delta modulator. The encoder comprises a first input for receiving the PDM input signal and a second input for receiving additional information, which comprises at least one data-bit. The encoder is configured to generate a multi-bit telegram on the basis of the additional information, the telegram comprising a predefined bit sequence. The encoder is further configured to replace an appropriate number of consecutive bits of the input signal with the telegram in order to generate an output signal.

The predefined bit-sequence is preferably chosen such that it has a neglectable occurrence probability in a regular PDM signal. Furthermore, the timing of the PDM input signal preferably is not changed by the encoder, such that the number of bits, which are replaced in the input signal, is equal to the number of bits of the replacing telegram. The output signal can be sent to a receiver, for example via a serial line or the like.

The replacing of bits within the input signal for generating the output signal has no impact on the generating process of the means for generating the PDM input signal. In particular, if the means are realized by a sigma-delta modulator, stability of the sigma-delta modulator is not influenced by a replacement within the encoder.

The additional information can be transmitted immediately or almost immediately without delay, as there are no defined starting points within the PDM input signal.

In various implementations, the telegram comprises the predefined bit-sequence and at least one further bit which is based on the additional information. Preferably, the telegram starts with the predefined bit-sequence and has the additional information coded in the at least one further bit following the predefined bit-sequence. The number of bits corresponding to the additional information can be chosen depending on the application. Preferably, the number of additional bits, or the number of bits of the telegram, is fixed. The predefined bit-sequence may be unique or chosen from a set of possible or available bit sequences, which are known to the encoder and a connected receiver in advance.

In other implementations the encoder is configured to select one predefined bit-sequence from a set of predefined bit-sequences based on the additional information, such that the telegram consists of the selected predefined bit-sequence. For example, several predefined bit-sequences exist which have a sufficiently low occurrence probability. For each bit combination of possible additional information, one of the available predefined bit-sequences is defined, such that a respective predefined bit-sequence is taken as the telegram used for replacement in the input signal, if a certain additional information is provided to the encoder. Hence, the number of bits which are replaced within the PDM input signal can be kept as low as possible, resulting in a lower impact on the data to be transmitted.

In one embodiment of the transmitter, the encoder is configured, if the predefined bit-sequence is detected within the input signal by the encoder, to alter at least one bit value of the input signal within the detected predefined bit-sequence. Although the occurrence probability of the predefined bit-sequence may be low within the input signal, the bitstream of the input signal can be altered in order to prevent a connected receiver or decoder to interpret the predefined bit-sequence as an indicator for a telegram comprising additional information. The at least one bit value to be altered in the input signal is preferably the last bit of the predefined bit-sequence detected within the input signal. Hence, delay times for such a replacement can be kept low or be avoided.

For example, the encoder may further be configured, if the predefined bit-sequence is detected within the input signal by the encoder, to alter the same number of bit values of the input signal after the detected predefined bit-sequence in the opposite direction. For example, if the last bit of the predefined bit-sequence detected in the input signal is changed from zero to one, the next following one bit after the detected bit sequence is changed from one to zero. As a consequence, an average bit value in the output signal is kept in balance with respect to the original PDM input signal.

In a further embodiment of the transmitter, the encoder is configured to generate the multi-bit telegram such that the telegram contains a predefined number of ones and a predefined number of zeros. In particular, the number of ones and zeros may be equal in the resulting telegram. Hence, if the resulting output signal is evaluated by a receiver or decoder, which is not able to detect the predefined sequence, an average value is generated in the decoded output signal which has the least possible deviation from the average of the original input signal. As a consequence, the transmitter can be used with all kinds of standard PDM receivers.

In a further embodiment of the transmitter, the encoder is configured to determine an intermediate value corresponding to a mean value of ones and zeros of the consecutive bits, which are replaced. Bit values of the input signal after the replaced bits are altered by the encoder based on the intermediate value.

For example, the replacement of the bits after the replaced consecutive bits is performed such that the mean value of the telegram and the bit values changed thereafter is achieved on the basis of the mean value of the original bits. For example, it is known to the encoder and a connected decoder that the telegram will be replaced by a predefined replacement sequence, which has a known mean value. Accordingly, one or more bits after the replaced bits, i.e. the telegram, are altered such that the mean value of the consecutive bits before replacement by the telegram is restored. As a consequence, an impact on the data to be transmitted by the PDM signal is at least partially compensated for by restoring the mean value.

Preferably, this embodiment can be combined with the previous embodiment specifying the number of ones and zeros in the telegram. In particular, if the telegram has the same mean value as the predefined replacement sequence, the effective mean value in the output signal is preserved regardless of whether a connected decoder is capable of decoding the telegram or not.

According to one embodiment of a receiver for receiving a PDM signal from a transmitter according to one of the embodiments described above, the receiver comprises a decoder. The decoder is configured to detect a predefined bit-sequence within the PDM signal, to extract a multi-bit telegram from the PDM signal based on the detection of the predefined bit-sequence, and to retrieve additional information from the telegram. The decoder is further configured to replace the multi-bit telegram within the PDM signal by a predefined replacement sequence having an appropriate number of bits.

In particular, the predefined bit-sequence to be detected by the detector is identical to the predefined bit-sequence used within the encoder of the transmitter according to the embodiments described above. For example, both the encoder and the decoder know which bit-sequences are used as the predefined bit-sequence or which set of predefined bit-sequences can be used by the encoder for encoding different additional information.

Preferably, the predefined replacement sequence basically comprises an equal number of ones and zeros. By this measure, an impact on the resulting signal output of the decoder can be minimized.

For example, a processing signal is generated by the decoder on the basis of the PDM signal, wherein the processing signal can be further processed by a signal processor or the like.

According to one embodiment of a transmission system, the transmission system comprises a transmitter according to one of the embodiments described above and a receiver according to one of the embodiments described above. For example, such a transmission system comprises a sensor whose sensor signal is transmitted as a PDM signal to an evaluation block, wherein additional information is transmitted within the bitstream from the sensor part of the system to the evaluation block.

According to one embodiment of a signal processing method, additional information comprising at least one data bit is received. A multi-bit telegram is generated on the basis of the additional information, wherein the telegram comprises a predefined bit-sequence. An appropriate number of consecutive bits of a PDM input signal is replaced with the telegram in order to generate an output signal. The output signal is transmitted. For example, the method is performed in a transmitter according to one of the embodiments described above.

In a further embodiment of the signal processing method, the method comprises further method steps. In particular, it is detected whether the predefined bit-sequence is present within the transmitted output signal and the multi-bit telegram is extracted from the transmitted output signal based on the detection of the predefined bit-sequence. The additional information is retrieved from the extracted telegram, and the telegram within the transmitted output signal is replaced by a predefined replacement sequence having an appropriate number of bits. For example, the above method steps are performed in a receiver according to one of the embodiments described above.

Further embodiments of the signal processing method become apparent from the embodiments of the transmitter and the receiver described above.

The text below explains the invention in detail using exemplary embodiments with reference to the drawings. Same references are used for same elements or elements having a similar function in the various figures. Hence the description of elements in one figures are not repeated in the following figures.

Figure 2:
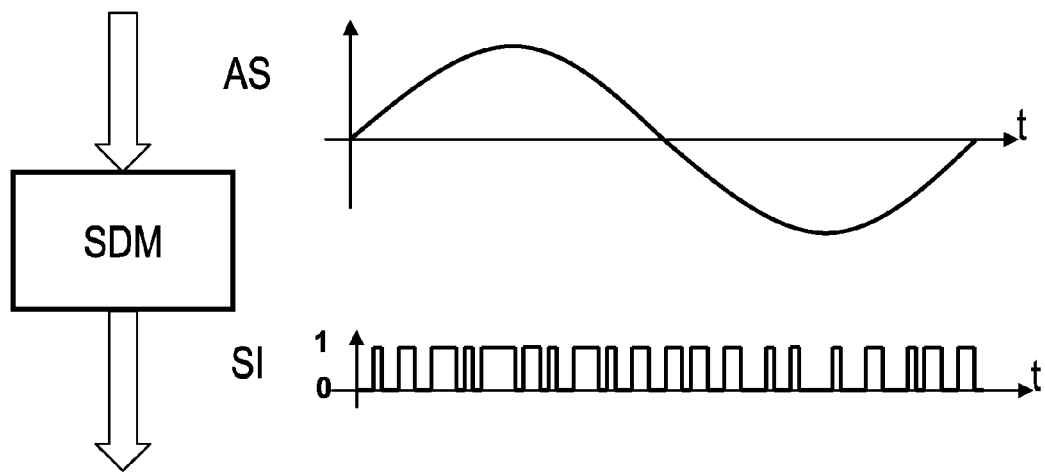
Figure 3:
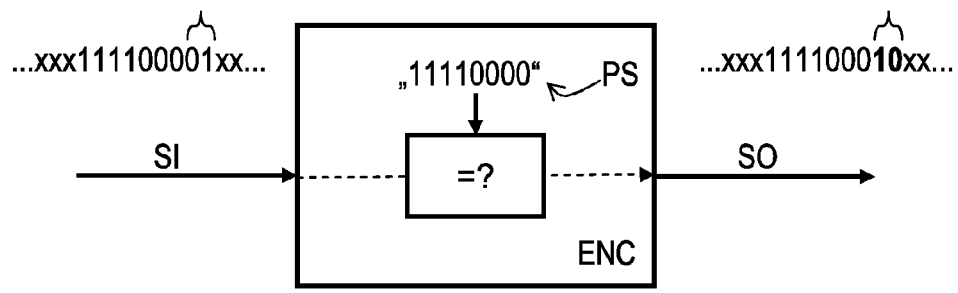
Figure 4:
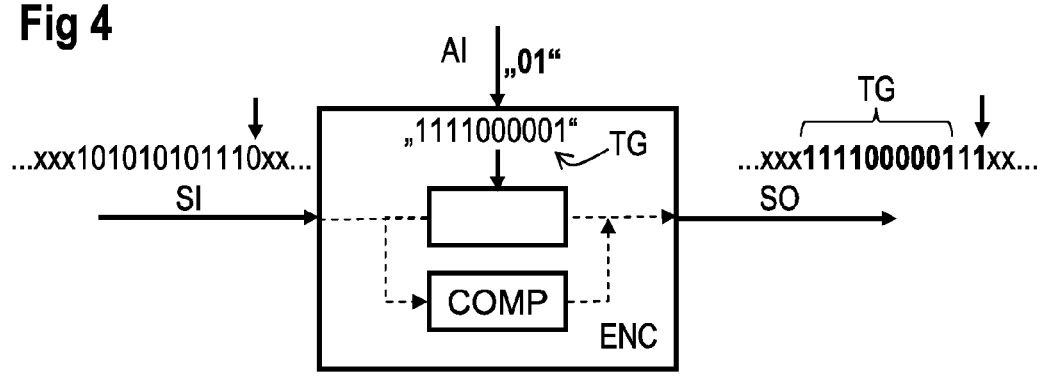
Figure 5:
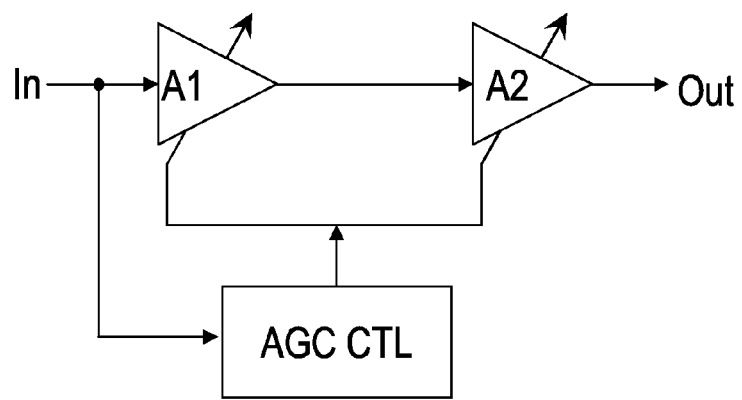
Figure 6:
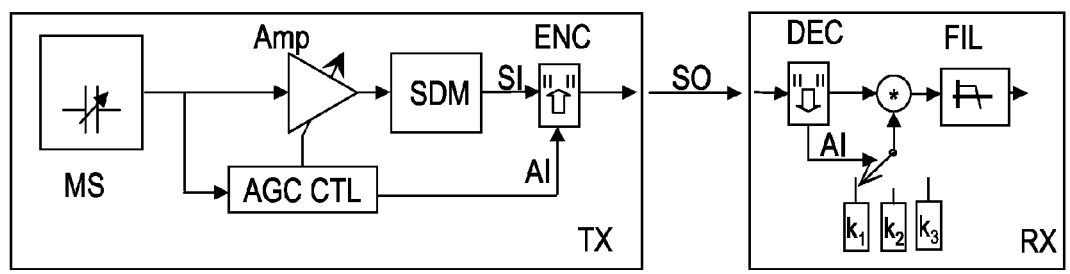

In the drawings:

FIG. 1 shows an embodiment of a transmission system with a transmitter and a receiver, FIG. 2 shows an embodiment of a device for generating a pulse density modulated signal, FIG. 3 shows an embodiment of an encoder, FIG. 4 shows a further embodiment of an encoder, FIG. 5 shows an embodiment of an automatic gain control system, and FIG. 6 shows a further embodiment of a transmission system.

FIG. 1 shows an embodiment of a transmission system with a transmitter TX and a receiver RX. The transmitter TX comprises means SDM for generating a pulse density modulated, PDM, input signal SI and an encoder ENC. For example, the means SDM for generating the PDM signal are realized by a sigma-delta modulator. The encoder ENC comprises a first input for receiving the PDM input signal SI, which is a bitstream of zeros and ones. In the drawing, the bitstream of the input signal SI is exemplarily shown as a series of Xs, wherein each X stands for a zero or a one respectively. At a second input, the encoder ENC receives additional information AI, particularly in a digital format. In the drawing of FIG. 1, the additional information AI comprises, serving only as an example, a bit-sequence 01. The bit length of the additional information AI can be chosen to be different from 2 but preferably is fixed to a certain number. The additional information AI is provided to the encoder only on demand, for example if a new status information or a new control information is to be transmitted from the transmitter TX to the receiver RX.

If the additional information AI is provided to the encoder, the encoder is configured to generate a telegram TG comprising a predefined bit-sequence PS, which in the depicted embodiment is given by the sequence 11110000. Other predefined sequences PS can be chosen in various embodiments. After the predefined sequence PS, the telegram comprises the databits 01 of the additional information AI such that the resulting telegram consists of the bit-sequence 1111000001. The predefined sequence PS is chosen such that it has a low or a zero occurrence probability within the regular input signal SI. The original bits of the input signal SI, which are replaced by the telegram TG are discarded in this embodiment. Consequently, the encoder generates an output signal SO still being a bitstream with the respective bits replaced by the telegram TG. A timing of the input signal is not changed by the encoder ENC.

The output signal SO is transmitted to the receiver RX wherein specific electrical components for transmission and reception of the bitstream are omitted in this drawing for preserving a better overview.

The receiver RX comprises a decoder DEC and a pulse density modulation signal processor PDM SP. The decoder DEC is configured to detect the predefined sequence PS within the signal SO and to extract the additional information, which is the bit-sequence 01 in this case, for further evaluation by circuit parts of the receiver or circuits connected to the receiver RX. The bits of the signal SO, which have carried the telegram TG, are replaced by a predefined replacement sequence RS, which is chosen to be 0101010101 in this specific embodiment. The replacement sequence RS can be chosen with other bit-sequences as well. Preferably, the replacement sequence RS has the same number of zeros and ones, such that a balanced mean value of theoretically 0.5 results.

The bitstream with the replacement sequence RS, being the output signal of the decoder DEC, is provided to the signal processor PDM SP for further evaluation of the bitstream. As a mean value of 0.5 is chosen for the replacement sequence RS, the impact on the original data, that is the difference to the original bits replaced by the encoder ENC, is kept as low as possible.

In the embodiment of FIG. 1, the telegram consists of the predefined sequence PS and attached data bits. However, it is also possible that both the encoder ENC and the decoder DEC have a set of possible predefined sequences from which one sequence is selected depending on the additional information AI. For example, a different predefined sequence is chosen for each possible combination of data bits of the additional information AI. Both the decoder DEC and the encoder ENC known which bit combination, or which additional information AI respectively, corresponds to which predefined sequence.

The number of bits of the predefined bit-sequence PS is taken as eight in the embodiment of FIG. 1. However, even shorter, for example six bits, or longer sequences PS can be chosen, depending on the respective application.

For example, it can be shown that the sequences 000111 and 111000, hence six-bit sequences, have a low occurrence probability in a regular PDM bitstream. Hence, one or both of these sequences can be chosen as the predefined sequence PS.

For an eight-bit predefined sequence PS, an even greater number of possible sequences are available, having a low occurrence probability. For example, the following sequences can be used:
00000011, 00000111, 00001011, 00001101, 00001110, 00001111, 00010110, 00010111, 00011011, 00011100, 00011101, 00011110, 00011111, 00100111, 00101111, 00111000, 00111100, 00111110, 01000111, 01001111, 01110000, 01110001, 01110100, 01111000, 01111001, 10000111, 10001011, 10001110, 10001111, 10110000, 10111000, 10111100, 11000001, 11000011, 11000111, 11010000, 11011000, 11100000, 11100001, 11100010, 11100011, 11100100, 11101000, 11101001, 11110000, 11110001, 11110010, 11110100, 11111000

FIG. 2 shows an exemplary embodiment of means SDM for generating a PDM signal. The means SDM receive an analog input signal AS, which is shown as a sinusoidal signal in the drawing of FIG. 2. Based on the analog signal AS, the means SDM generates the pulse density modulated signal SI consisting of a stream of zeros and ones. The generation of PDM signals is well-known in the art, as well as the demodulation of such PDM signals, which for example can be performed by a low pass filtering.

FIG. 3 shows an embodiment of an encoder ENC which is based on the embodiment of FIG. 1. In particular, the encoder ENC is configured to analyze the bitstream of the input signal SI and to change one or more bits of the input signal when generating the output signal SO, if the predefined sequence PS is present in the input signal SI. Hence, a false evaluation within the decoder DEC can be prevented.

In particular, the input signal SI of this embodiment comprises a bit-sequence 111100001. The encoder detects whether the predefined sequence PS, in this embodiment 11110000, is present within the input signal SI. As this is the case in the depicted example, the encoder ENC alters the last zero bit of the predefined sequence PS of the input signal SI to a one. Furthermore, to maintain the mean value of the input signal SI, the following one bit after the predefined sequence of the input signal SI is altered to zero in the output signal SO. In summary, the last two bits of the input signal SI, depicted by the curly braces, namely 01, are replaced by the bit-sequence 10 in the output signal SO, also depicted by curly braces. No predefined sequence PS is present in the output signal SO. Hence, the decoder will not try to interpret the bit-sequence as a telegram TG.

In various embodiments, altering of the second bit for maintaining the mean value can be omitted. If the last bit of the predefined sequence is a one, altering of the bits is performed in the opposite direction, such that a one is replaced by a zero and a zero is replaced by a one.

As only one or two bits are changed in the output signal SO, impact on the original data is kept at a minimal level. However, it is advantageous if the predefined sequence PS has a low or a zero occurrence probability, such that the impact of the operation described in conjunction with FIG. 3 never or rarely occurs.

FIG. 4 shows a further embodiment of an encoder ENC being based on the embodiment of FIG. 1. Furthermore, the embodiment of FIG. 4 can be combined with the embodiment of FIG. 3.

The encoder ENC comprises a compensation block COMP which is configured to determine an intermediate value corresponding to a mean value of input bits of the input signal SI, which are to be replaced by the telegram TG. Accordingly, bits of the output signal SO are altered such that the mean value of the output signal SO can be balanced out, in particular such that the output signal SO has the same mean value over time as the input signal SI.

In the exemplary embodiment of FIG. 4, additional information AI in the form of the bit-sequence 01 is provided to the encoder ENC, which generates the telegram TG from the additional information, consisting of the bit-sequence 1111000001. The encoder ENC is further provided with an input sequence within the input signal SI being arbitrarily chosen for this embodiment to 101010101110. This sequence has a mean value of $7/12$, which can also be represented as an intermediate value having one more 1 than half the number of bits of the sequence. As the encoder ENC knows that the telegram TG will be replaced by a sequence having five zeros and five ones, for example, the following two bits are altered such that seven of twelve bits have a bit value of 1. In particular, the last bit of value 0 of the input signal SI, depicted by the arrow, is replaced by the value of 1 within the output SO, also depicted by an arrow. Hence, in the decoder, the original mean value of the input signal SI is re-established after replacement of the telegram TG by the replacement sequence RS.

FIG. 5 shows an exemplary embodiment of an automatic gain control, AGC, system which comprises a first and a second amplifier A1, A2 connected in series and a control unit AGC CTL for controlling gain factors of the amplifiers A1, A2. In particular, an input signal In is amplified by the amplifiers A1, A2 to generate output signal Out. Furthermore, the input signal In is provided to the control unit AGC CTL.

For example, to get an optimal noise performance at a given maximum signal level of the input signal In, the gain of the amplifier A1 may be chosen as large as possible to suppress noise influences of the amplifier A2, but still low enough to allow an undistorted signal representation at the output of the first amplifier A1. With the automatic gain control, AGC, this gain is adjusted at run time depending on the actual signal level, such that for example the gain of the amplifier A1 is made large if the signal In is small and the gain of the amplifier A1 is reduced for larger signals by the control block AGC CTL. The second amplifier is adjusted concurrently to keep an overall gain from In to Out, resulting from the product of the gain factors of the amplifiers A1 and A2, constant regardless of a signal level of the input signal In.

The principle described in the embodiment of FIG. 5 can be used for transmitting sensor signals. For example, FIG. 6 shows an embodiment of a transmission system with a transmitter TX and a receiver RX. The transmitter TX comprises a sensor MS, which may be implemented as a capacitive microelectromechanical-system-microphone, MEMS-microphone, whose output signal is provided to an amplifier AMP and the control unit AGC CTL. The output signal of the amplifier AMP is provided to the means SDM for generating a PDM signal SI, which is provided to the encoder ENC. One control signal of the control unit AGC CTL is used for setting a gain factor of the amplifier AMP. A second control signal is provided to the encoder as additional information AI to be transmitted to the receiver side.

The receiver comprises the decoder DEC, a weighting element W coupled to the signal output of the decoder DEC. One of three weighting factors K1, K2, K3 is selected in dependence on the additional information AI extracted by the decoder DEC. Hence, the PDM output signal of the decoder DEC is weighted by the respective weighting factor and provided to a filter unit FIL.

With reference to FIG. 5 the gain factor of the amplifier AMP corresponds to the amplifier A1 while the weighting factor K1, K2 or K3, corresponds to the gain factor of the amplifier A2. Hence, a constant overall gain can be established with the system of FIG. 6. In particular, the bitstream out of the decoder DEC is weighted digitally before a digital filtering by the filter unit FIL.

The control information, which controls which weighting factor or gain factor is to be chosen in the receiver RX, is transmitted from the control unit AGC CTL to the receiver side, encoded within the telegram TG of the output signal SO.

The transmitter TX and the receiver RX can be integrated in individual integrated circuits, which are independent of each other. In various embodiments, the encoder can be used also with a decoder which is missing the described functionality with little impact on the output signal in the receiver. However, preferably both the transmitter and the receiver have the respective functionality of encoding and decoding, respectively, of the described telegrams.

REFERENCE LIST

TX transmitter
RX receiver
ENC encoder
DEC decoder
SDM generating means
SI input signal
SO output signal
AI additional information
TG telegram
PS predefined sequence
RS replacement sequence
PDM SP PDM signal processor
A1, A2 amplifier
AGC CTL AGC control
MS sensor
FIL filter unit
COMP compensation block

The invention claimed is:

1. A transmitter for transmitting a pulse density modulated signal comprising means for generating a pulse density modulated input signal and an encoder, the encoder comprising:
   a first input for receiving the pulse density modulated input signal; and
   a second input for receiving additional information comprising at least one data bit,
   wherein the encoder is configured to generate a multi-bit telegram on the basis of the additional information, the telegram comprising a predefined bit-sequence, and to replace an appropriate number of consecutive bits of the input signal with the telegram in order to generate an output signal.

2. The transmitter according to claim 1, wherein the encoder is configured, if the predefined bit-sequence is detected within the input signal by the encoder, to alter at least one bit value of the input signal within the detected predefined bit-sequence.

3. The transmitter according to claim 2, wherein the encoder is configured, if the predefined bit-sequence is detected within the input signal by the encoder, to alter the same number of bit values of the input signal after the detected predefined bit-sequence in the opposite direction.

4. The transmitter according to one of claims 1 to 3, wherein the encoder is configured to generate the multi-bit telegram such that the telegram contains a predefined number of ones and a predefined number of zeros, in particular an equal number of ones and zeros.

5. The transmitter according to claim 1, wherein the encoder is configured to determine an intermediate value corresponding to a mean value of ones and zeros of the consecutive bits, which are replaced, and to alter bit values of the input signal after the replaced bits based on the intermediate value.

6. The transmitter according to claim 1, wherein the telegram comprises the predefined bit-sequence and at least one further bit, which is based on the additional information.

7. The transmitter according to claim 1, wherein the encoder is configured to select one predefined bit-sequence from a set of predefined bit-sequences based on the additional information, such that the telegram consists of the selected predefined bit-sequence.

8. The transmitter for receiving a pulse density modulated signal from a transmitter according to claim 1, the receiver comprising a decoder, which is configured:
   to detect a predefined bit-sequence within the pulse density modulated signal;
   to extract a multi-bit telegram from the pulse density modulated signal based on the detection of the predefined bit-sequence;

to retrieve additional information from the telegram; and to replace the multi-bit telegram within the pulse density modulated signal by a predefined replacement sequence having an appropriate number of bits.

9. The transmitter according to claim 8, wherein the predefined replacement sequence basically comprises an equal number of ones and zeros.

10. A signal processing method, the method comprising:
receiving additional information comprising at least one data bit;
generating a multi-bit telegram on the basis of the additional information, the telegram comprising a predefined bit-sequence;
replacing an appropriate number of consecutive bits of an pulse density modulated input signal with the telegram in order to generate an output signal; and
transmitting the output signal.

11. The signal processing method according to claim 10, further comprising:
detecting, whether the predefined bit-sequence is present within the input signal; and
altering at least one bit value of the input signal within the detected predefined bit-sequence.

12. The signal processing method according to claim 10 or 11, further comprising:
determining an intermediate value corresponding to a mean value of ones and zeros of the consecutive bits, which are replaced; and
altering bit values of the input signal after the consecutive bits, which are replaced, based on the intermediate value.

13. The signal processing method according to claim 10, wherein the telegram comprises the predefined bit-sequence and at least one further bit, which is based on the additional information.

14. The signal processing method according to claim 10, wherein one predefined bit-sequence is selected from a set of predefined bit-sequences based on the additional information, such that the telegram consists of the selected predefined bit-sequence.

15. The signal processing method according to claim 10, further comprising:
detecting, whether the predefined bit-sequence is present within the transmitted output signal;
extracting the multi-bit telegram from the transmitted output signal based on the detection of the predefined bit-sequence;
retrieving the additional information from the extracted telegram; and
replacing the telegram within the transmitted output signal by a predefined replacement sequence having an appropriate number of bits.

* * * * *